United States Patent Office 3,471,641
Patented Oct. 7, 1969

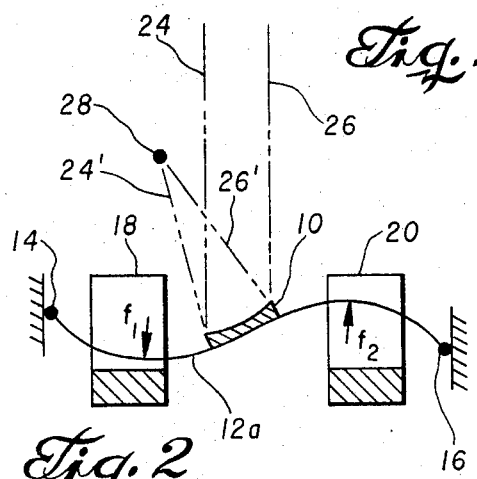
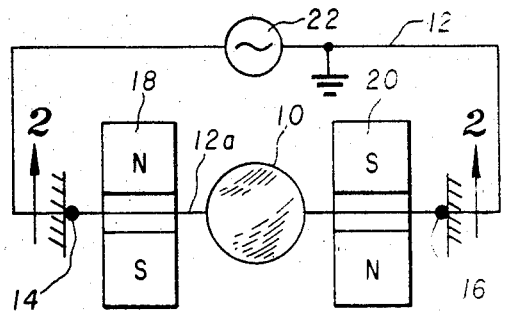
Fig. 1
Fig. 2
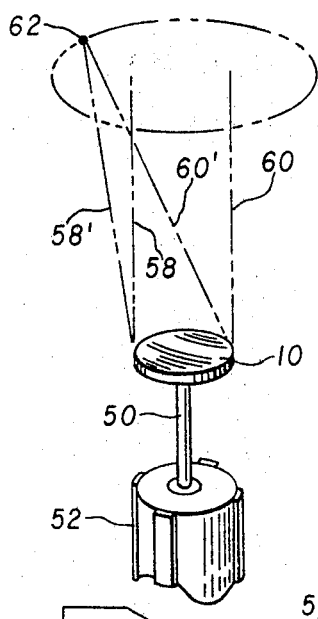
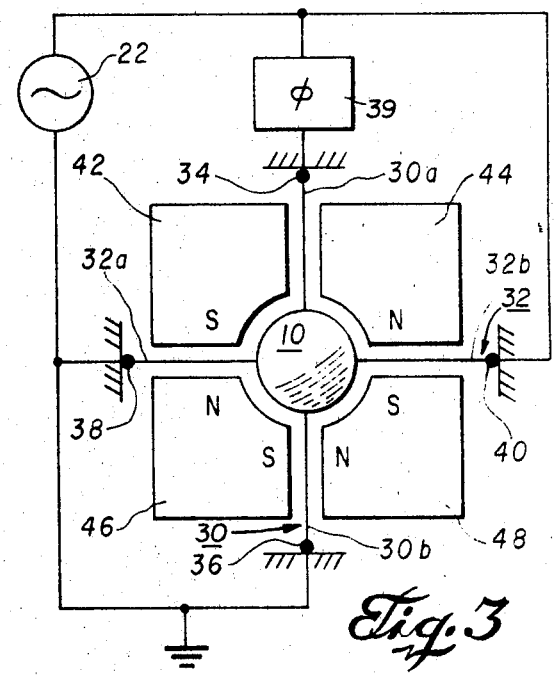
Fig. 3
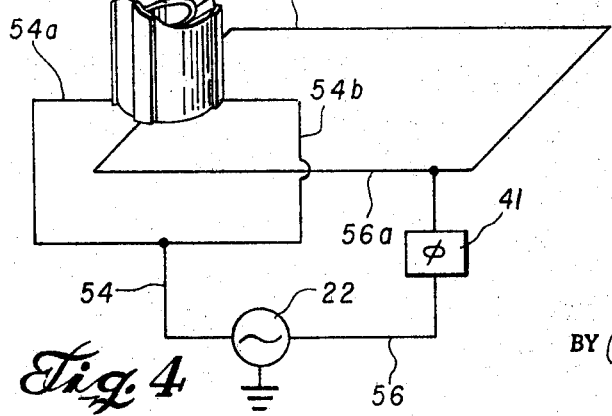
Fig. 4
Charles E. Baker
Bob E. Martel
George J. Slocum
INVENTORS
BY René E. Grossman
ATTORNEY

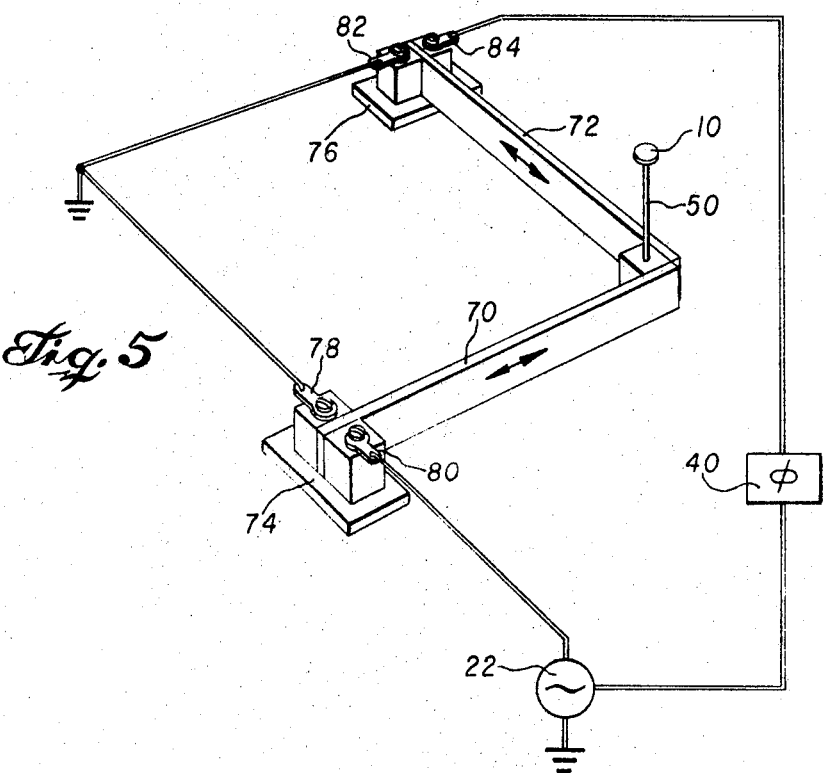
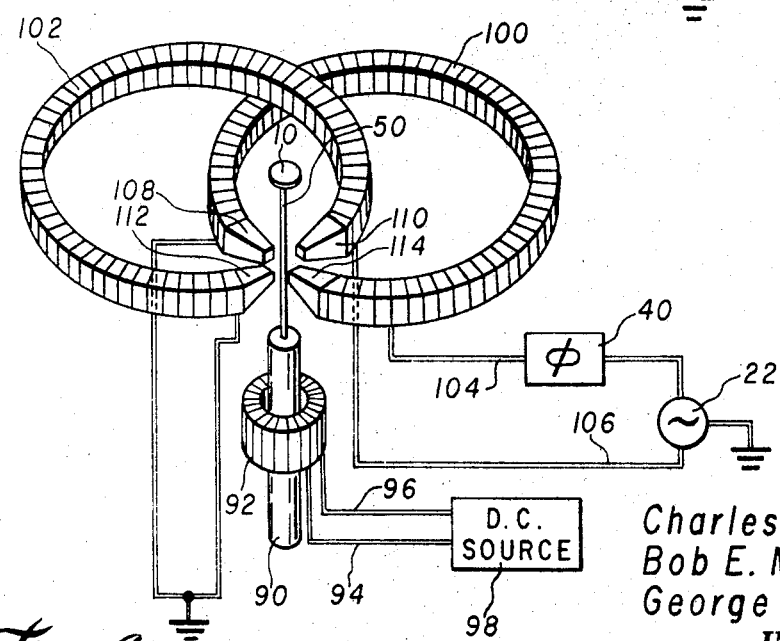
Charles E. Baker
Bob E. Martel
George J. Slocum
INVENTORS
BY René E. Grossman
ATTORNEY

3,471,641
RESONANT SCANNING APPARATUS FOR DEFLECTING A MIRROR
Charles E. Baker and Bob E. Martel, Dallas, and George J. Slocum, McKinney, Tex., assignors to Texas Instruments Incorporated, Dallas, Tex., a corporation of Delaware
Filed Sept. 1, 1965, Ser. No. 484,380
Int. Cl. H04n *3/02*
U.S. Cl. 178—7.6        16 Claims

ABSTRACT OF THE DISCLOSURE

Disclosed is a scanning apparatus which deflects a mirror in a defined path. Said apparatus operates at a predetermined frequency and is comprised of a resonant means substantially tuned to said predetermined frequency, a driving means for operating said resonant means at said predetermined frequency, thereby causing a deflection of said resonant means, and a reflecting device attached to said resonant means having a movement indicative of the deflection of said resonant means.

---

This invention relates to scanning apparatus and more particularly to an apparatus for deflecting a mirror in a predetermined path.

An object of the invention is to provide an apparatus for deflecting a mirror in a defined path at a predetermined frequency.

Another object of the invention is to provide an apparatus which is resonant at the scanning frequency to decrease power requirements.

Another object is to provide an apparatus which is both structurally simple and easy to operate.

For a more complete understanding of the invention and for further objects and advantages thereof, reference may now be had to the following description when read in conjunction with the appended claims and accompanying drawings in which:

FIGURE 1 is a top view of a basic single axis scanner;
FIGURE 2 is a sectional view of the scanner of FIGURE 1 taken along the section line 2—2 in FIGURE 1;
FIGURE 3 is a top view of a basic two axis scanner;
FIGURE 4 is another embodiment of the two axis scanner of FIGURE 3;
FIGURE 5 is another embodiment of the two axis scanner of FIGURE 4;
FIGURE 6 is still another embodiment of a two axis scanner utilizing a magnetic driving means.

Referring now to FIGURES 1 and 2, the basic parts of the single axis scanner are illustrated, showing the relationship between the parts and the cooperation therebetween. The scanner comprises a mirror 10 attached (by epoxy cement, for example) to a conductor 12, the section 12a of conductor 12 being affixed at points 14 and 16. A source 22 generating an alternating current of a predetermined frequency is serially connected with conductor 12. The frequency of the alternating current is that frequency at which the device will scan. Section 12a of the conductor 12 is taut, that is, under tension and is tuned to be resonant at the frequency at which the scanner operates. The frequency at which section 12a resonates is dependent upon its diameter and the tension to which it is subjected. Section 12a of conductor 12 is mounted between two oppositely poled magnets 18 and 20 which create a magnetic flux in opposite directions across spaced portions of conductor section 12a.

In operation, when alternating current of predetermined frequency from source 22 is passed through conductor 12 (and therefore section 12a), one portion of the section 12a is deflected upward while the other portion is deflected downward. Therefore, when a collimated beam of light represented by rays 24 and 26 is reflected from mirror 10, the reflected rays 24' and 26' will focus to a point 28.

A force is exerted on the spaced portions of conductor section 12a according to the same principle which governs and makes possible the electric motor. Whenever a conductor section 12a constituting part of a closed electric circuit is situated in a magnetic flux, such as between oppositely poled magnets 18 and 20, and the conductor section is not parallel to that flux and is carrying an alternating electric current, there is a force upon that conductor which tends to move it through the magnetic field. When the conductor is restrained at its ends, the conductor will be deflected at that portion wherein the magnetic field interacts with the alternating current.

Two portions of conductor section 12a are between and perpendicular to the magnetic fields created by magnets 18 and 20. Since these magnets are oppositely poled, in one-half cycles forces $f_1$ and $f_2$ (shown in FIGURE 2) will be exerted in opposite directions upon those portions of section 12a within the magnetic field. In the other half-cycle, the forces $f_1$ and $f_2$ will be reversed (from the directions shown in FIGURE 2). Thus in one-half cycle of the alternating current, a downward force will be exerted upon a portion of section 12a, and in the other half cycle an upward force will be exerted on that same portion; the exact opposite occurring on the other portion of section 12a. When the alternating current supplied to conductor 12a is sinusoidal, point 28 will scan generally the arc of a circle, but over a very short portion of that arc, point 28 will scan substantially a straight line with a sinusoidally varying velocity.

FIGURE 3 illustrates a two axis scanner having two wires 30 and 32 placed 90° to each other. Sections 30a and 30b of conductor 30 are attached to points 34 and 36, respectively, while sections 32a and 32b of conductor 32 are attached to points 38 and 40, respectively. A source 22 generating an alternating current of a predetermined frequency is connected to conductors 30 and 32. A phase-shifting circuit 39 is inserted in conductor 30 which displaces in phase the alternating current supplied to conductor 30 with respect to that supplied to conductor 32. Magnets 42, 44, 46 and 48 are so arranged that the conductor sections 30a and 30b are surrounded by flux in opposite directions, respectively, and conductors 32a and 32b are surrounded by flux in the same manner beforementioned. That is, the magnetic field across conductor section 30a will always be opposite to that across 30b and the magnetic field across section 32a will always be opposite to that across 32b. Similarly with respect to the single axis scanner of FIGURE 1, the conductor sections 30a and 30b and 32a and 32b are under tension and are tuned to resonate at the frequency at which the scanner is to operate.

It is well known that various patterns may be generated by selecting combinations of currents which have differing phase relationships. One example of this is the lissajous patterns which may be generated on the face of an oscilloscope. By combining two sinusoidal waves of equal magnitude and 90° out of phase, for example, a circular scan may be generated. Also, by combining two ramp-modulated sine waves of equal magnitude and 90° out of phase, a spiral scan may be generated. The scanner of FIGURE 3 utilizes this principle.

Basically, the theory of operation of the two axis scanner illustrated by FIGURE 3 is similar to that of the single axis scanner illustrated by FIGURES 1 and 2. Each conductor section 30a and 30b is driven by an alternating current 90° out of phase, for example, to that of conductor sections 32a and 32b. As in the single axis scanner, in one-half cycle, sections 30a and 30b will have forces exerted on them in opposite directions, the same being true of sections 32a and 32b. In the next half-cycle, the forces on the respective sections will reverse. When the alternating current is sinusoidal, a circular scan at the frequency of the alternating current will result.

For the cross-wire scanner to generate a circular scan at the standard TV line rate, for example, (that being, 15,750 c.p.s.) conductors 30a and 30b and 32a and 32b are tuned to 15,750 c.p.s. Tuning is achieved by varying the tension of said conductors which, in one example, were 0.010 inch-diameter and one inch long. The mirror 10 had a 0.125 inch diameter. This scanner and the ones described hereinafter may be used in combination with a fiber optic bundle which convert the circular scan of constant velocity to a straight line scan of constant velocity with essentially zero flyback time.

FIGURE 4 illustrates another embodiment of the scanner of FIGURE 3. As the resonant element, the scanner uses a fiber 50 (made of glass or quartz, for example) attached to the scanning mirror 10 with epoxy cement. The scanner is adjusted to resonance by cementing the proper length of fiber to the piezoelectric transducer driver 52. Increasing or decreasing the length of the fiber will cause the resonant frequency of the fiber to be decreased or increased, respectively, since the resonant frequency of the fiber varies inversely as the square of its length. An electrical source 22 generating an alternating current of a predetermined frequency is connected to conductors 54 and 56. Sections 54a and 54b of conductor 54 are physically connected to opposite poles of the piezoelectric transducer 52. Sections 56a and 56b are connected to the other two opposite poles of said transducer. Phase-shifting network 41 is inserted in conductor 56 such that the alternating current generated in conductor 54 may be displaced in phase with respect to the alternating current in conductor 56.

In operation, the scanner of FIGURE 4 is functionally similar to the cross-wire scanner of FIGURE 3. The resonator and driver functions (which are performed by the fiber 50 and the piezoelectric transducer 52, respectively) in the scanner of FIGURE 4 are combined in the taut wires which carry the alternating current in the magnetic field in the crossed-wire scanner of FIGURE 3.

In operation, two sinusoidal signals of equal magnitude, 90° out of phase, are supplied to the piezoelectric transducer 52 via conductor sections 54a–54b and sections 56a–56b. These signals cause the poles of the transducer to be alternately stressed into tension and compression. The stress causes a circular deflection of the transducer driver, the deflection being transferred to the resonant fiber 50. The resonant fiber acts as a mechanical transformer, amplifying the circular deflection of the transducer caused by applying the two sinusoidal signals 90° out of phase to the transducer. The transformed motion causes the mirror 10 to rotate in a circular mode which will, in turn, cause the collimated beam of light represented by rays 58 and 60 impinging thereon to be reflected into rays 58' and 60' and focus to point 62. This point will, in turn, scan a circular path a constant velocity. The mode of vibration of resonant fiber 50 (and the scanners utilizing such a fiber explained hereinafter) is such that mirror 10 describes substantially a nutating or nodding motion with essentially no translational motion.

For the scanner of FIGURE 4 to generate a circular scan at the standard TV line rate, that being 15,750 c.p.s., the resonant fiber 50 should be, for example, a 0.007 inch diameter quartz rod with a length of approximately 0.150 inch. The transducer is a standard lead titanate zirconate (PZT) piezoelectric transducer such as Clevite Part No. 60099; the mirror may be a 0.050 inch diameter circular concave mirror.

FIGURE 5 illustrates another embodiment of the scanner of FIGURE 4, utilizing a different type of piezoelectric driver. Shown in said FIGURE 5 are two piezoelectric length expander bars 70 and 72 which expand and contract depending upon the electrical excitation supplied. These expander bars replace the tubular piezoelectric transducer 52 of FIGURE 4. Each expander bar is coated with silver so that electrical connection may be made from said bars through metal clamps 74 and 76 to contacts 78, 80, 82 and 84. The clamps grip the expander bars but are adjustable to allow the length of the bars to be changed for tuning. Electrical excitation is supplied by source 22 which applies an alternating current of a predetermined frequency to said expanders. A phase-shifting network 40 is capable of displacing in phase the alternating current at contact 84 with respect to that at contact 80. Resonant fiber 50 is attached at one end (by epoxy cement, for example) at the intersection of said expanders. Mirror 10 is attached to the other end of said fiber.

The theory of operation of this scanner is basically the same as that of the scanner of FIGURE 4. The expander bars expand and contract in response to the electrical excitation, and when this excitation is provided by two sinusoidal currents substantially 90° out of phase (as caused by phase-shifting network 40), the resonant fiber-mirror combination will be deflected so as to scan a circular path at the frequency of said signal source 22.

For a 15,750 c.p.s. scanner connected in the configuration illustrated in FIGURE 5, the resonant fiber could be made of quartz and should be about 0.150 inch long. The piezoelectric expander bars may be made of Glennite HDT–31 Lead Zirconate Lead Titanate.

FIGURE 6 illustrates a two axis scanner utilizing a magnetic driving means. The mirror 10-resonant fiber 50 is constructed as one unit (similar to a straight pin) and is made of a magnetic material, such as magnetic stainless steel, for example. Clamp 90 holds in place the resonant fiber 50 and is surrounded by a biasing coil 92 which has a direct current flowing through it via conductors 94 and 96 supplied by D.C. source 98. Clamp 90 is made of a magnetic material also. Surrounding resonant fiber 50 are electromagnetic driving elements 100 and 102, each of which has a plurality of turns of wire surrounding it. Electrical source 22 supplies an alternating current at a predetermined frequency to these drivers via conductors 104 and 106. Connected serially with conductor 104 is a phase-shifting network 40 capable of displacing in phase the current supplied to driver 100 with respect to the current supplied to driver 102.

In operation, a direct current is passed from source 98 through the biasing coil 92, which magnetizes the clamp-fiber-mirror combination. It will be recognized that if clamp 90 is made of a non-magnetic material the biasing coil 92 would then encircle the resonant fiber 50 instead. The paramount consideration is to have the resonant fiber magnetized, that is, to have a north and south pole established so as to scan said fiber. When one-half cycle of alternating current is sent through driving elements 100 and 102, the end pieces 108, 110, 112 and 114 of these elements will be magnetized with a certain polarity (i.e., north-south pole relationship), and during the next half cycle, the polarities at these ends will be reversed. Since resonant fiber 50 is magnetized, the fiber will be deflected in a path depending upon the polarity of the end pieces. When the alternating current supplied to drivers 100 and 102 is sinusoidal, and when phase-shifting network 40 displaces the sinusoidal current in driver 100 90° in phase with respect to the sinusoidal current in driver 102, mirror 10 will be deflected in a circular path.

Although the above scanners were used to provide a circular scan at the standard TV line rate of 15,750 c.p.s., it will be recognized that said scanners have utility in other ranges of frequency for other uses, such as infrared applications. These scanners may be tuned to be resonant at other frequencies by adjusting the tension upon the crossed-wires or varying the length of the resonant fiber, depending upon the type of scanner construction used.

Also, by utilizing other alternating current waveforms, different scanning paths may be obtained, such as a ramp-modulated sine wave producing a spiral type scan. Therefore, although the present invention has been shown and illustrated in terms of specific preferred embodiments, it will be apparent to those skilled in the art that changes and modifications are possible without departing from the spirit and scope of the invention as defined in the appended claims.

What is claimed is:

1. A scanning apparatus, comprising:
   (a) a conductor under tension,
   (b) a source of alternating current electrically connected to said conductor,
   (c) means for producing a magnetic flux in opposite directions on spaced portions of said conductor, and
   (d) a mirror attached at one point only to said conductor, whereby when an alternating current is passed through said conductor, a movement is produced in said mirror indicative of the deflection of said conductor.

2. A scanning apparatus, comprising:
   (a) a pair of conductors at right angles to each other, each conductor of said pair of conductors being under tension,
   (b) a source of alternating current connected to each conductor of said pair of conductors,
   (c) means for producing a magnetic flux in opposite directions on spaced portions of each conductor of said pair of conductors, and
   (d) a mirror attached to said pair of conductors, whereby when an alternating current is pased through each conductor of said pair of conductors surrounded by said magnetic flux, the mirror moves in a direction indicative of the deflection of said pair of conductors.

3. A scanning apparatus according to claim 2 including means for shifting the phase of the alternating current in one conductor of said pair of conductors with respect to the alternating current in the other conductor of said pair of conductors, thereby to cause a predetermined deflection of said mirror.

4. A scanning apparatus operating at a predetermined frequency, comprising:
   (a) a pair of conductors at right angles to each other and substantially tuned to resonate at said pre-determined frequency,
   (b) a source of alternating current connected to said pair of conductors,
   (c) a phase-shifting network connected to one conductor of said pair of conductors, whereby the alternating current supplied to one conductor of said pair of conductors is out of phase with the alternating current supplied to the other conductor of said pair of conductors,
   (d) means for producing a magnetic flux in opposite directions on spaced portions of each of said pair of conductors, said magnetic flux being essentially perpendicular to the length of each of said pair of conductors, and
   (e) a mirror attached at the intersection of said conductors, thereby to produce a deflection of said mirror at said predtermined frequency.

5. A scanning apparatus according to claim 4 wherein said source produces a sinusoidal alternating current and said phase-shifting network shifts said alternating current in one conductor of said pair of conductors 90° with respect to the alternating current in the other conductor of said pair of conductors.

6. A scanning apparatus operating at a predetermined frequency, comprising:
   (a) a piezoelectric transducer capable of being deflected in a predetermined manner,
   (b) driving means for electrically operating said transducer to cause a deflection thereof,
   (c) resonant means substantially tuned to said predetermined frequency, said means being attached to said transducer to amplify the deflection of said transducer,
   (d) and a reflecting device attached to one end of said resonant means, said reflecting device having a movement indicative of the deflection of said transducer and said resonant means.

7. A scanning apparatus operating at a predetermined frequency, comprising:
   (a) a piezoelectric transducer,
   (b) driving means for electrically operating said transducer to produce a deflection of at least one end of said transducer,
   (c) a resonant fiber substantially tuned to said predetermined frequency, said driving means being attached to one end of said transducer to amplify the deflection of said transducer,
   (d) and a mirror attached to one end of said resonant fiber having a movement indicative of the deflection of said transducer and said resonant fiber.

8. A scanning apparatus, comprising:
   (a) a piezoelectric transducer having four poles thereon,
   (b) means for applying alternating current to each of said four poles of said transducer to cause a deflection of said transducer,
   (c) a resonant fiber attached to one end of said transducer to amplify the deflection of said transducer,
   (d) and a mirror attached to one end of said resonant fiber having a movement indicative of the deflection of said transducer and said resonant fiber.

9. A scanning apparatus according to claim 8, including a phase-shifting network to displace in phase the alternating current supplied to two of said poles with respect to the alternating current supplied to the other two of said poles.

10. A scanning apparatus according to claim 9 wherein said means for supplying alternating current generates a sinusoidal current and said phase-shifting network shifts 90° in phase the current supplied to two of said poles with respect to the other two of said poles.

11. A scanning apparatus, comprising:
    (a) a pair of piezoelectric length expanders, the ends of said expanders being placed at 90° to each other,
    (b) driving means for electrically operating each of said expanders to cause a deflection thereof by alternately expanding and contracting each of said expanders,
    (c) a resonant fiber attached at the intersection of the ends of said expanders to amplify the deflection of each of said expanders,
    (d) and a mirror attached to one end of said resonant fiber, said mirror having a movement indicative of the deflection of said expanders and said resonant fiber.

12. A scanning apparatus according to claim 11 wherein said driving means includes means for applying an alternating current to each of said expanders, and means for displacing in phase the alternating current applied to one of said expanders with respect to the alternating current applied to the other of said expanders.

13. A scanning apparatus according to claim 12 wherein said means for generating an alternating current produces and applies a sinusoidal current to each of said expanders and said phase displacing means displaces by 90° the alternating current supplied to one of said expanders with respect to the current supplied to the other of said expanders.

14. A scanning apparatus, comprising:
    (a) a resonant fiber,
    (b) a mirror attached to said resonant fiber,
    (c) a biasing coil having a direct current flowing therein for magnetizing said resonant fiber,
    (d) two electromagnetic driving elements surrounding said resonant fiber, and
    (e) means for supplying an alternating current to each of said elements, thereby to cause a flexural deflection of said resonant fiber whereby said mirror is deflected such that a two-dimensional scan responsive to said deflection is produced when radiant energy strike said mirror.

15. An apparatus according to claim 14, including a means to displace in phase the alternating current supplied to one of said elements with respect to the alternating current supplied to the other of said elements.

16. An apparatus according to claim 15 wherein said means for supplying an alternating current produces a sinusoidal current and said phase displacing means displaces in phase the current supplied to one of said elements substantially 90° with respect to the alternating current supplied to the other of said elements.

References Cited

UNITED STATES PATENTS

| | | | |
|---|---|---|---|
| 1,839,706 | 1/1932 | Silberstein | 178—6 |
| 1,839,777 | 1/1932 | Silberstein | 178—7.6 |
| 1,966,354 | 7/1934 | Noxon | 178—7.6 |
| 2,034,583 | 3/1936 | Koch | 178—7.6 |
| 2,089,155 | 8/1937 | Walton | 178—7.6 |
| 2,090,853 | 8/1937 | Priess | 178—7.6 |
| 2,095,391 | 10/1937 | Legg | 178—7.6 |
| 2,465,898 | 3/1949 | Martin | 178—7.6 |
| 3,146,367 | 8/1964 | McNaney | 313—86 |

ROBERT L. GRIFFIN, Primary Examiner

RICHARD K. ECKERT, Jr., Assistant Examiner

U.S. Cl. X.R.

178—7.1